Figure 1:
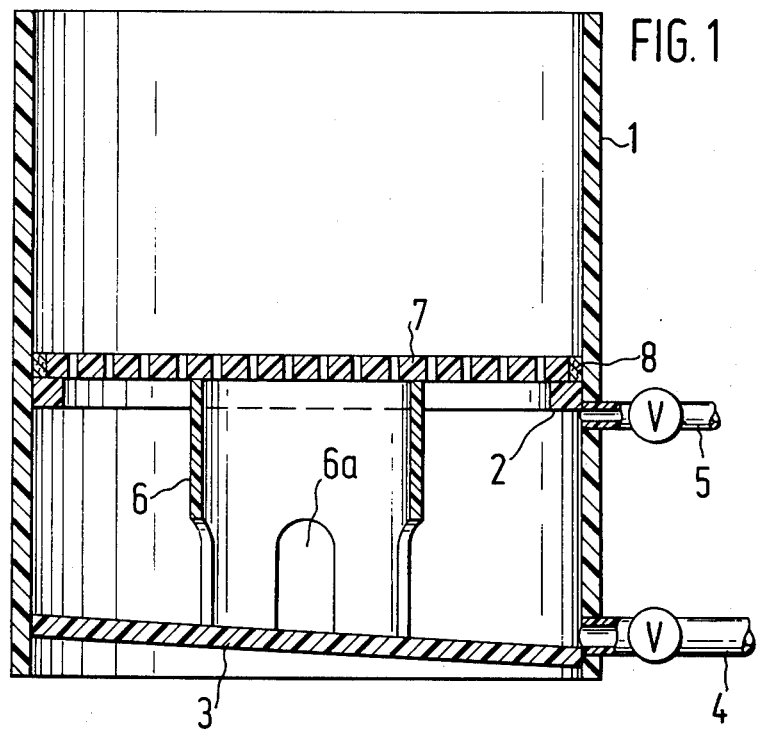

United States Patent [19]

Patzner

[11] 4,052,163

[45] Oct. 4, 1977

[54] PLASTIC VACUUM SUCTION FUNNEL

[75] Inventor: Alfred Patzner, Schwalbach, Taunus, Germany

[73] Assignee: Hoechst Aktiengesellschaft, Frankfurt am Main, Germany

[21] Appl. No.: 694,826

[22] Filed: June 10, 1976

[30] Foreign Application Priority Data

June 12, 1975 Germany .............................. 2526295

[51] Int. Cl.² ....................... B01D 23/28; B01D 35/00
[52] U.S. Cl. ........................................ 23/259; 23/292; 210/406; 210/455; 210/464; 210/477

[58] Field of Search .................. 23/259, 292; 210/406, 210/455, 464, 477

[56] References Cited
PUBLICATIONS

Sargent-Welch Scientific catalog, 538, 540 (1971).

Primary Examiner—Sidney Marantz
Attorney, Agent, or Firm—Curtis, Morris & Safford

[57] ABSTRACT

A plastic vacuum suction filter or funnel is composed of a cut tube wherein a thrust ring is mounted in close contact with the inner wall, which thrust ring, together with a support, carries the sieve plate; the support resting on a slightly inclined funnel bottom.

3 Claims, 2 Drawing Figures

U.S. Patent    Oct. 4, 1977    4,052,163

PLASTIC VACUUM SUCTION FUNNEL

For separating solids from suspensions, suction filters or funnels are known as indispensable devices in each laboratory. Hitherto, such funnels have been made exclusively from earthenware, clay or porcelain. Although the known suction funnels have proved to be useful laboratory and even industrial-scale equipment, certain limits due to the material are set to their application.

A special disadvantage resides in the fact that the known suction funnels have an insufficient impact strength and shock resistance and thus often a very short life. Repair of damaged or broken suction funnels is possible only exceptionally.

Furthermore, it is disadvantageous that the known suction funnels are relatively heavy and cannot be handled easily any more when exceeding a certain size. For this reason alone, suction funnels having diameters of more than 80 cm did not make their way in industrial practice.

It has now been found that vacuum suction funnels do not display the above disadvantages when they are manufactured from thermoplastics.

Especially suitable thermoplastics for this application are low pressure polyethylene, polypropylene, copolymers of ethylene and/or propylene with other olefins.

Because of their high impact strength and shock resistance, such vacuum funnels are substantially inert to mechanical strain, and if they should be damaged, they may be repaired in simple manner by welding or bonding. Furthermore, the low weight of plastic vacuum suction funnels allows the manufacture of such funnels in hitherto unknown sizes. Because of the stability of the plastics used, the walls of such funnels may be substantially thinner than those of the funnels known heretofore, which results in a further saving of weight, so that even very large plastic suction funnels having diameters of more than 1 m can be easily handled. It should also be mentioned that the suction funnels of the invention are not liable to burst even in the case where very hot products are suction-filtered and that they are extraordinarily resistant to nearly all chemicals. The manufacture of such a suction funnel (FIG. 1) is especially simple.

Figure 2:
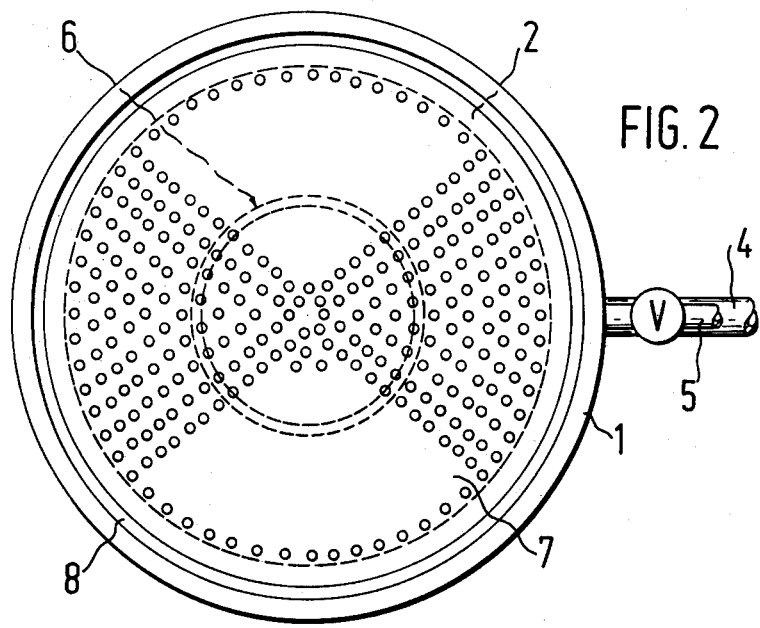

FIG. 1 is a vertical sectional view of a suction filter constructed in accordance with one embodiment of the present invention; and FIG. 2 is a plan view of the suction filter illustrated in FIG. 1.

A suction tube according to the present invention as illusrated in FIG. 1 which shows a plastic tube 1 having a diameter of 1600 mm and a wall thickness of 40 mm is cut to the intended length, and a thrust ring 2 is welded in its interior. Subsequently, the slightly inclined funnel bottom 3, a piece for the discharge of the filtrate 4, a vacuum connection piece 5 and a support 6 are mounted. The latter support may be in the form of a tube 6 having openings 6a which allow the filtrate to leave the funnel. Subsequently, a sieve plate 7 is laid onto the thrust ring 2 and sealed by means of a cord 8 made for example from asbestos, or a sealing mass. FIG. 2 represents a plan view of the suction funnel of the invention.

The above manufacturing mode brings about simultaneously another advantage as compared to suction funnels hitherto known: the funnels of the invention may be manufactured without previous preparation of molds, requiring only easily available semi-finished articles such as tubes and plates which can be assembled by means of simple tools to form the suction funnels of the invention.

The size of the suction funnels obtainable according to the present invention allows for the first time to use suction funnels not only in the laboratory, but also in large-scale industrial processes.

What is claimed is:

1. A vacuum suction filter comprising a generally cylindrical tube, a thrust ring mounted within said tube and tightly engaged therewith, a bottom wall mounted in one end of said tube and closing off said one end of the tube, a sieve plate support member seated on said bottom wall and extending therefrom to the level of said ring in said tube, and a perforated sieve plate seated on said thrust ring and said support member in spaced relation to said bottom wall to define a vacuum chamber in said tube, a first conduit connected in communication with said chamber through said tube adjacent said thrust ring for applying a vacuum to said chamber, and a second conduit connected in communication with said chamber through said tube and near said bottom wall to permit filtrate from said chamber, said bottom wall being inclined towards said second conduit; said tube, bottom wall, sieve plate and sieve plate support member all being formed of plastic materials.

2. The suction filter as defined in claim 1 wherein said plastic material comprises a plastic selected from the group consisting of polyethylene, polypropylene, and copolymers of ethylene and/or propylene.

3. The suction filter as defined in claim 2 wherein said tube has an internal diameter of approximately 1600 mm.

* * * * *